Sept. 19, 1967     J. T. SCHUPLIN     3,342,098

SEALED EXPANSION FASTENER

Filed Aug. 16, 1965

INVENTOR.
JEROME T. SCHUPLIN
BY Jeare, Fetzer & Jeare
ATTORNEYS

United States Patent Office 3,342,098
Patented Sept. 19, 1967

3,342,098
SEALED EXPANSION FASTENER
Jerome T. Schuplin, Parma Heights, Ohio, assignor to Tinnerman Products, Inc., a corporation of Ohio
Filed Aug. 16, 1965, Ser. No. 479,959
21 Claims. (Cl. 85—83)

This invention relates to fastening devices, and more particularly relates to an improved construction for a fastening device of the type to receive a threaded element for mounting an article, such as a panel or the like, with a support structure.

Heretofore, it has been known to provide fastening devices that may be inserted into an apertured work piece and expanded by the insertion of a threaded element, such as a screw, to attach the device to the work piece. In some instances, such heretofore known devices have included flexible multi-shank portions adapted to be inserted into and expanded in the aperture of the work piece by means of a threaded element. Such arrangements, however, in many instances are too flexible and/or form only partial threads upon insertion of the threaded element which greatly reduces the holding power of the device. In other instances, the flexibility of the shank portions have been reduced by making the entry end portion thereof a completely closed and/or of solid construction. Such arrangements, though more rigid, are extremely difficult to install in the aperture in the work piece, particularly when there exists any appreciable tolerance variation between the parts and/or when the aperture is of a non-uniform configuration. In addition, such arrangements do not provide an effective seal to prevent the entry of foreign materials, such as moisture, dirt, dust and the like, through the aperture in the work piece.

Accordingly, it is a principal object of the invention to provide a fastening device made from polymeric material which is of a simple one-piece construction, yet which is of a rugged construction for economic quantity mass production.

Another object of the present invention is to provide a fastening device of the character described which can be easily inserted into an opening of a support structure and which includes a novel tube-like construction for holding in self-threading relationship a threaded element inserted therein.

A further object of the present invention is to provide a fastening device of the character described including flexible shank portions associated with the tube-like construction which may be biased into engagement with the support structure to prevent axial and/or rotational movement of the device relative to the work structure.

A still further object of the present invention is to provide a fastening device of the character described which includes a novel polygonal tube-like member having integral shank portions which incorporate good flexibility, yet sufficient rigidity to provide an effective seal to prevent the entry of foreign materials, such as moisture, dirt, dust and the like, through the opening in the support structure.

Other objects and advantages of the present invention will become apparent from the following description taken in conjunction with the accompanying drawings, wherein.

Figure 1:
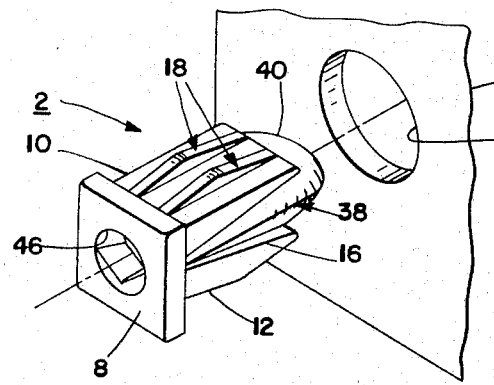
FIG. 1 is a generally perspective view of the fastening device made in accordance with the present invention in position to be inserted into an aperture in a work structure.
Figure 2:
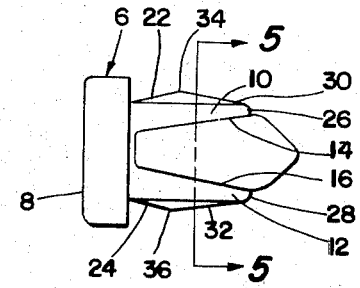
FIG. 2 is a side elevation view of the fastening device made in accordance with the present invention.

Referring then again to the drawings and in particular to FIG. 1 thereof, the fastening device, designated generally at 2, embodying one form of the present invention is shown positioned for insertion through an opening 4 in a support structure S. The device 2 is preferably of a unitary, one-piece construction made from a polymeric material, such as nylon or the like, which may be easily produced for quantity mass production by conventional extrusion, molding or other similar forming methods, as known in the art.

As best shown in FIGS. 2 to 5, the body 6 of the device 2 includes a polygonal, such as square shaped, head portion 8 and a pair of spaced apart, oppositely disposed flexible shank portions 10 and 12 which extend generally axially from the head portion 8. The shank portions 10 and 12 are preferably polygonal, such as rectangular, in top plan FIG. 3, and are preferably polygonal, such as triangular in side elevation FIG. 2, having generally planar under surfaces 14 and 16 which extend divergently away from one another in a direction away from the head portion 8. It will be noted, that the shank portions 10 and 12 are relatively thick adjacent the head portion 8 and are progressively diminished in thickness toward the ends remote from the head portion 8 to provide optimum strength characteristics in the area adjacent the head portion 8 and to provide optimum flexibility characteristics adjacent the ends remote from the head portion 8 to facilitate insertion into the aperture 4 in the support structure S. Each of the shank portions 10 and 12 includes on its exterior surface a pair of laterally spaced, cam-like ribs 18 and 20 which extend axially from the head portion 8. The spaced pairs of ribs 18 and 20 are tapered divergently away from the head portion 8, as at 22 and 24, and extend divergently from the free ends 26 and 28 of the respective shanks, as at 30 and 32, so as to merge at high points or apices 34 and 36. Such arrangement provides smooth cam surfaces to facilitate insertion through the opening 4 in the support structure S and effectively prevents axial and/or rotational movement of the device in the assembled position thereof, as will hereinafter be more fully described.

Figures 3, 4:
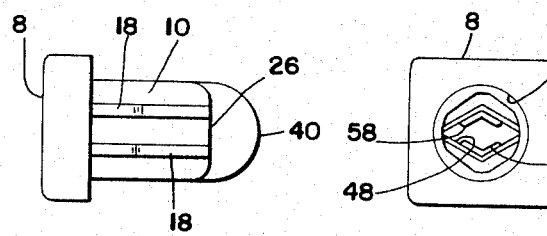
FIG. 3 is a top plan view of the fastening device illustrated in FIG. 2.
FIG. 4 is an end view looking from the lefthand side of FIG. 2.

A central hollow, tube-like member 38 is made integral with and extends axially from the head portion 8 intermediate the respective shank portions 10 and 12. The tube-like member 38 projects axially beyond the free ends 26 and 28 of the respective shank portions 10 and 12 and terminates in a tapered closed end portion 40 which is generally rounded, such as semi-circular in top plan, as shown in FIG. 3. The exterior surface of the tube-like member 38 is preferably polygonal, such as elliptical, in cross-section and is made integral with the generally planar under surfaces 14 and 16 of the respective shank portions 10 and 12, as at 42 and 44, as will be seen in FIG. 5.

Figure 5:
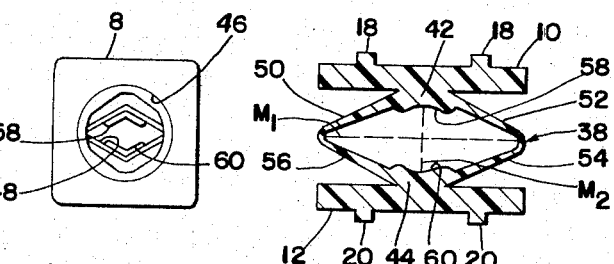
FIG. 5 is an enlarged vertical section view taken along the plane of lines 5—5 of FIG. 2.

In accordance with the present invention, the head portion 8 preferably includes a circular counter-sunk aperture 46 which communicates with a bore 48 that extends axially through the tube-like member 38 that terminates adjacent the closed end portion 40, thereby which together are adapted to receive a threaded element T, such as a screw or the like, therein. Preferably, the bore 48 is of a polygonal, such as diamond shaped, configuration in cross-section defined by four integral, obliquely disposed, generally planar side walls 50, 52, 54 and 56 having a major transverse dimension M1 and a minor transverse dimension M2, as best shown in FIG. 5. It will be noted that the side walls 50–56 are relatively thick adjacent the minor transverse dimension M2 and are of a progressively diminished, relatively thin thickness adjacent the major transverse dimension M1, thereby to greatly enhance the flexibility characteristics of the tube-like member 38 to provide, in effect, a "bellows" action, whereby the tube-like member 38 may be laterally expanded and collapsed upon insertion and withdrawal of the threaded element T from the device.

Figure 6:
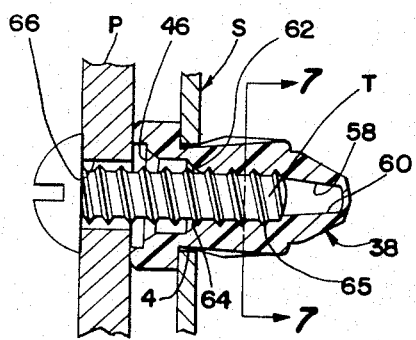
FIG. 6 is a fragmentary section view showing the fastening device of the present invention assembled in a support structure with a threaded element inserted through the device for mounting an article, such as a panel, to the support structure.

In further accordance with one embodiment of the present invention, the interior surfaces of the side walls 50–56 defining the bore 48 are provided with a pair of spaced, oppositely disposed arcuate ribs 58 and 60 which depend inwardly adjacent the minor transverse dimension M2. The ribs 58 and 60 commence with smooth curved shoulder portions 62 and 64 (FIG. 6) spaced inwardly from the head portion 8 and extend convergently therefrom toward one another and terminate generally adjacent the closed end portion 40 of the tube-like member 38. Preferably, the transverse dimension between the convergent ribs 58 and 60 adjacent the shoulder portions 62 and 64 may be generally the same as or slightly less than the maximum or pitch diameter of the threaded element T, while the transverse dimension between the convergent ribs becomes progressively and substantially less than such dimension of the threaded element T in a direction toward the closed end portion 40 of the tube-like member 38, whereby complementary threads may be cut into the respective ribs 58 and 60 the full length, as at 65, thereof, upon turning movement of the threaded element T through the bore 48. By this oppositely disposed convergent rib construction, substantially full depth threads may be cut into the ribs 58 and 60 so as to exert a maximum holding force on the threaded element T while the spaces disposed on either side of the respective ribs 58 and 60 provide relief areas so as to enable the threaded element T to be "backed-off" from self-threaded engagement with the ribs 58 and 60 for quick and easy disassembly of the parts. Furthermore, such rib construction provides rigidity in the tube-like member 38 for retaining the shank portions 10 and 12 in positive locking engagement with the confronting surfaces presented by the opening 4 in the support structure S and in a manner so as not to impair the flexibility characteristics of the device for application through various size and/or shape openings in the support structure.

In a typical application, the device 2 is applied simply by inserting the closed end portion 40 of the tube-like member 38 through the opening 4 in the support structure S until the head portion 8 is seated flush against the confronting surface of the support structure. Upon insertion of the device through the opening 4, the tapered surfaces 22, 24, 30 and 32 of the respective pairs of ribs 18 and 20 provide a cam-like action which compresses the shank portions 10 and 12 inwardly toward one another so that the high point or apices 34 and 36 on the ribs 18 and 20 are enabled to pass through the opening 4 of the support structure. Preferably, the opening 4 in the work structure S is of a polygonal shape having a dimension which may be the same as or slightly less than the maximum transverse dimension between the high points or apices 34 and 36 of the respective ribs 18 and 20. The aperture, however, may also be of any suitable circular or polygonal shape, such as square or rectangular shaped, which has at least one maximum transverse dimension which is the same as or slightly less than the transverse dimension between the apices 34 and 36, for the purposes as aforesaid.

Thus inserted, a suitable work piece P, such as a panel, having an opening 66 may then be positioned adjacent the head portion 8 of the device 2, whereupon, the threaded element T may then be inserted through the aligned openings 66 and 4 provided in the work piece P and support structure S, respectively, and into the device 2. As the threaded element T is turned into self-threading engagement with the oppositely disposed, convergent ribs 58 and 60 within the bore 48, the tube-like member which was initially elliptical in one direction is now laterally expanded so as to be elliptical in the opposite direction or in a plane which is perpendicular to the plane of the original elliptical shape, as will be seen by a comparison of FIGS. 5 and 7. Such transformation in shape of the tube-like member 38 is greatly facilitated by the progressively diminished thickness of the side walls 50–56 in a direction from the minor transverse dimension M2 toward the major transverse dimension M1 of the bore 48. Thus, as the threaded element T is turned through the bore 48, the opposed shank portions 10 and 12 are biased outwardly away from one another by the progressive lateral transformation in shape of the tube-like member 38 so as to bring the tapered surfaces 22, 24, 30 and 32 of the exterior pairs of ribs 18 and 20 into positive locking engagement with the confronting surfaces presented by the opening 4 in the support structure S. Furthermore, such transformation in shape from elliptical in one direction to elliptical in the opposite direction maintains a sufficient radial inward pressure on the convergent interior ribs 58 and 60, whereby full depth threads are provided for substantially the full length of the ribs to exert a maximum holding power on the threaded element T in the assembled position thereof.

Figures 7, 8:
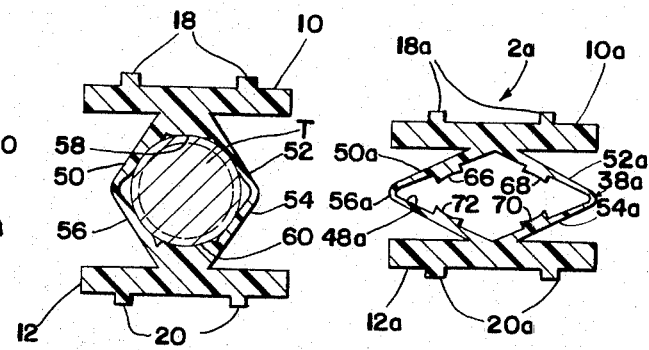
FIG. 7 is an enlarged vertical section view taken along the plane of lines 7—7 of FIG. 6.
FIG. 8 is a vertical section view of a modification of the fastening device made in accordance with the present invention; and, FIG. 9 is an end view of another modified form of the fastening device made in accordance with the present invention.

In FIG. 8 there is shown a modification of the fastening device 2a which is substantially identical to the fastening device described in connection with FIGS. 1 to 7, as shown by identical reference numerals with the suffix a added, except that in this form, the obliquely disposed side walls 50a–56a defining the bore 48a of the tube-like member 38a each include an integral rib 66, 68, 70 and 72 which projects inwardly therefrom by an amount sufficient to provide self-threading engagement with a threaded element adapted to be inserted through the bore 48a. By this construction, an even greater holding power is exerted upon the threaded element without impairing the flexibility characteristics of the tube-like member 38a. Furthermore, such construction provides a greater uniformity in expansion of the tube-like member 38a for biasing the exterior cam-like ribs 18a and 20a of the shank portions 10a and 12a into locking engagement with the support structure in the assembled position of the device. Moreover, it can be seen that the interior surface of the bore 48a may be provided with any number and/or arrangement of interior ribs in accordance with the present invention.

Figure 9:
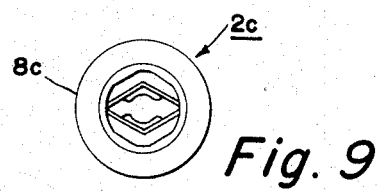

In FIG. 9 there is illustrated a fastening device 2c which is substantially identical to that described in connection with FIGS. 1 to 7, except that the head portion 8c is circular in shape and indicates that the head portion may be of any suitable shape for a wide variety of applications in accordance with the present invention.

From the foregoing description and accompanying drawings, it will be seen that the present invention provides a novel construction of a unitary, one-piece fastening device which may be quickly and easily assembled and disassembled for mounting an article, such as a panel, with an apertured support structure. It will be seen that the novel construction of the tube-like member depending from the head provides increased holding power on a threaded element by the formation of full depth threads substantially along the entire length of the threaded element to prevent withdrawal of the threaded element from the device while at the same time providing adequate relief to insure ready detachment of the threaded element from the device. Furthermore, it will be seen that the novel tube-like member provides optimum flexibility for locking the shank portions in gripping engagement with the confronting surfaces presented by the aperture in the support structure to prevent axial and/or rotational movement of the device relative to the work structure and which provides an effective seal to prevent the entry of foreign materials, such as moisture, dirt, dust and the like, from the aperture in the support structure.

The terms and expressions which have been used are used as terms of description and not of limitation, and there is no intention in the use of such terms and expressions of excluding any equivalents of any of the features shown or described, or portions thereof, and it is recognized that various modifications are possible within the scope of the invention claimed.

I claim:

1. A fastening device adapted for insertion through an opening in a support structure comprising, a head portion having an aperture therein, a tube-like means made integral with and extending from said head portion having a bore communicating with the aperture in said head portion for receiving a threaded means therein, shank means made integral with and cooperating with said tube-like means for retaining said device in the opening in said support structure upon spreading deformation of said tube-like means, and wherein said tube-like means is of a generally polygonal shape in external configuration defined by at least four obliquely disposed integral side walls having a closed entry end portion.

2. A fastening device in accordance with claim 1, wherein said bore has a generally polygonal internal configuration defined by a major transverse dimension and a minor transverse dimension extending between said side walls.

3. A fastening device in accordance with claim 2 wherein said side walls have a progressively reduced thickness extending in the general direction from said minor transverse dimension toward said major transverse dimension.

4. A fastening device for insertion into an opening in a support structure comprising, a head portion having an aperture therein, a pair of spaced, oppositely disposed shank portions extending from said head portion, a tube-like member extending from said head portion intermediate said shank portions having an axial bore communicating with the aperture in said head portion for receiving a threaded element therein, said tube-like member being made integral with said shank portions and adapted to bias said shank portions outwardly away from one another for retaining said device in the opening in said support structure upon turning movement of said threaded element through said bore, and wherein said tube-like member is generally polygonal in external configuration defined by four obliquely disposed integral side walls having a closed entry end portion.

5. A fastening device in accordance with claim 4, wherein said bore is of a generally polygonal configuration having a major transverse dimension and a minor transverse dimension extending between said side walls.

6. A fastening device in accordance with claim 5, wherein said side walls have a progressively reduced thickness in a general direction from said minor transverse dimension towards said major transverse dimension.

7. A fastening device in accordance with claim 6, including rib means disposed adjacent said minor transverse dimension and projecting interiorly of said bore by an amount sufficient for self-threading coacting engagement with said threaded element.

8. A fastening device in accordance with claim 7 wherein said rib means extend convergently toward one another in a direction from said head portion toward the closed end portion of said tube-like member.

9. A fastening device for insertion into an opening in a support member, said device comprising a head having an aperture therein, a shank attached to and extending from said head, said shank including a pair of oppositely disposed shank portions spaced laterally from one another throughout their length, a hollow, tubular member extending from said head between said shank portions and attached on opposed sides to the medial under surfaces of said shank portions, said tubular member including an endless side wall defining a generally axially extending bore for receiving a movable element therein, said shank portions being operably connected to and disposed in engagement with said tubular member, whereby said shank portions are adapted to be moved outwardly by deformation of said tubular member into engagement with the confronting surface of said support member upon insertion of a movable element into said bore.

10. A fastening device in accordance with claim 9, wherein said tubular member is completely closed at the end remote from said head.

11. A fastening device in accordance with claim 9, wherein said shank portions have a length which is at least greater than one-half the length of said tubular member.

12. A fastening device in accordance with claim 9, wherein said shank portions extend divergently outwardly away from one another in a direction away from said head.

13. A fastening device in accordance with claim 9, wherein each of said shank portions includes cam-like means disposed on the side opposite from said tubular member adapted for engagement with the confronting marginal surfaces presented by the opening in said support member.

14. A fastening device in accordance with claim 9, wherein each of said shank portions includes an inner inclined surface and an outer planar surface, said inclined surface being disposed adjacent and in engagement with said tubular member, and said inclined and planar surfaces converging at a point remote from said head.

15. A fastening device in accordance with claim 9, wherein said tubular member is polygonal in transverse cross section.

16. A fastening device in accordance with claim 15, wherein said tubular member includes said side wall which comprises a plurality of side wall portions which together define major and minor axes, said side wall portions having a progressively reduced thickness extending in the general direction from said minor axis toward said major axis.

17. A fastening device in accordance with claim 9, wherein said tubular member includes internal means disposed on the interior surface of said side wall, and wherein said movable element comprises a threaded member for self-threading coaction with said internal means.

18. A fastening device in accordance with claim 17, wherein said internal means includes at least one pair of oppositely disposed ribs extending generally longitudinally of said bore.

19. A fastening device in accordance with claim 18, wherein the transverse distance between said ribs at the end remote from said head is less than the maximum transverse dimension of said movable element.

20. A fastening device in accordance with claim 17, wherein said internal means includes at least one pair of oppositely disposed ribs extending generally longitudinally of said bore, said ribs being disposed so as to extend convergently toward one another in a direction away from said head.

21. A fastening device in accordance with claim 20, wherein the transverse distance between said ribs progressively decreases in a direction away from said head to a value substantially less than the maximum transverse dimension of said movable element.

References Cited

UNITED STATES PATENTS

| 2,933,794 | 4/1960 | Biesecker | 85—82 |
| 3,038,223 | 6/1962 | Fiddler | 24—73 |
| 3,105,407 | 10/1963 | Rapata | 85—84 |
| 3,109,342 | 11/1963 | Disley | 85—82 |
| 3,203,304 | 8/1965 | Rapata | 85—83 |

FOREIGN PATENTS 1,351,655  12/1963  France.

CARL W. TOMLIN, *Primary Examiner.*

M. PARSONS, JR., *Assistant Examiner.*